United States Patent [19]
Shurcliff

[11] 4,117,882
[45] Oct. 3, 1978

[54] PROCESS AND APPARATUS FOR HEAT EXCHANGE

[75] Inventor: William A. Shurcliff, Cambridge, Mass.

[73] Assignee: Broad Corporation, Boston, Mass.

[21] Appl. No.: 735,418

[22] Filed: Oct. 26, 1976

[51] Int. Cl.² .............................................. F28D 17/00
[52] U.S. Cl. ................................. 165/104 S; 165/86; 126/400; 165/11
[58] Field of Search ............... 165/104 S, DIG. 4, 86, 165/107, 11; 126/400

[56] References Cited
U.S. PATENT DOCUMENTS 2,342,211   2/1944   Newton ..................... 165/104 S X

OTHER PUBLICATIONS

Whillier, A., *Letter to the Editor*, The Sun at Work, vol. 2, p. 2, 6/57.

*Primary Examiner*—Albert W. Davis
*Attorney, Agent, or Firm*—Paul J. Cook

[57] ABSTRACT

A process and apparatus is provided for storing thermal energy and subsequently releasing and extracting the stored thermal energy upon demand. At least one sealed container of salt hydrate is agitated continually and is positioned in heat exchange relationship with a heat exchange liquid which is passed between a thermal energy source and a container enclosing or partially enclosing the sealed container(s) for the salt hydrate. Agitation of the container(s) of salt hydrate prevents or minimizes salt separation and supercooling so that the latent heat of fusion of the salt hydrate can be stored and extracted by the heat exchange liquid upon demand, in addition to the sensible heat of the salt hydrate composition.

13 Claims, 4 Drawing Figures

PROCESS AND APPARATUS FOR HEAT EXCHANGE

BACKGROUND OF THE INVENTION

This invention relates to a method and apparatus for storing and subsequently releasing thermal energy. More particularly, this invention relates to a method and apparatus for storing and subsequently releasing thermal solar energy.

Prior to the present invention, a wide variety of salt hydrates have been utilized to store heat for subsequent extraction upon demand. These salt hydrates are useful for this purpose since each is characterized by a relatively high heat of fusion but the phase change between solid and liquid in each occurs at a different temperature within a moderate range of temperatures. Heat can be stored both as sensible heat and as the latent heat of fusion of the selected salt hydrate for subsequent release during crystallization of that salt hydrate at its usual phase-change temperature by heat exchange with any of a variety of heat exchange liquids.

Significant problems associated with all the salt hydrates have greatly limited their use as heat storage media. Many salt hydrates are prone to super-cooling so that the phase change from liquid to solid does not readily occur and the latent heat of fusion is not recovered when desired. This phenomenon has necessitated adding nucleating agents to the salt hydrates to minimize supercooling. Even the presence of nucleating agents does not assure that the salt hydrate will crystallize upon cooling. The salt hydrates also have a tendency to become dehydrated gradually when exposed to repeated phase-change thermal cycling. Dehydration results in the salts developing different densities dependent upon the degree of hydration, with accompanying separation and stratification of the salts. When this separation occurs, it becomes increasingly difficult to cause the salts to undergo phase change concurrently since they have developed different melting points. Thus, some of the salts in a container will not undergo a phase change and may not release the latent heat of fusion that otherwise would have been extracted during a given thermal cycle. It has been proposed also to suspend the salts in gelatinous types of medium to overcome the separation problem. However, this reduces the thermal capacity of the resultant composition on a volume basis and thereby reduces its heat exchange effectiveness.

It has also been proposed to agitate a container of the salt hydrate to prevent or minimize supercooling at or near the temperatures at which the salt hydrate undergoes phase change. In these methods, a heat exchange fluid is passed continuously into heat exchange relationship with the agitated container and then either is directed back to the source of heat or is directed to the area of ultimate use. In these proposals, the salt hydrate is the sole means for thermal storage while the heat exchange fluid is used solely to carry heat to the area of thermal demand or to transfer heat from the thermal energy source to the salt hydrate and this requires relatively high mass flow rates of heat exchange fluid, effective heat exchange surfaces and large amounts of salt hydrate.

Accordingly, it would be desirable to provide a means for storing thermal energy based upon the use of salt hydrates which avoids the problem of supercooling, which minimizes or prevents salt separation and modification caused by repeated thermal cycling and which provides low cost, effective heat exchange between the salt hydrate and the heat exchange fluid.

SUMMARY OF THE INVENTION

In accordance with this invention, one or more salt hydrates are stored in one or more closed first containers capable of being agitated and which are enveloped or partially enveloped by a second container containing a heat exchange liquid capable of extracting thermal energy from the salt hydrate and capable of transmitting thermal energy to the salt hydrate. The salt hydrate container(s) are sealed and the container for the heat exchange liquid is provided with inlets and outlets, through which the heat exchange liquid is moved. The volume ratio of heat exchange liquid in the second container to the salt hydrate is between about 1 to 20 and 2 to 1, preferably between 1 to 10 and 2 to 1.

In operation the heat exchange liquid is exposed to any source of thermal energy, including solar radiation. The heated liquid is passed into the second container to transmit thermal energy to the salt hydrate and then is passed out from the second container either to means of extracting energy from the heat exchange liquid or to redirect the liquid to the source of thermal energy. The salt hydrate obtains thermal energy from the heat exchange liquid as sensible and/or latent heat so that, at a later time, the stored thermal energy can be re-transmitted to the heat exchange liquid for ultimate use.

DESCRIPTION OF SPECIFIC EMBODIMENTS

Figure 1:
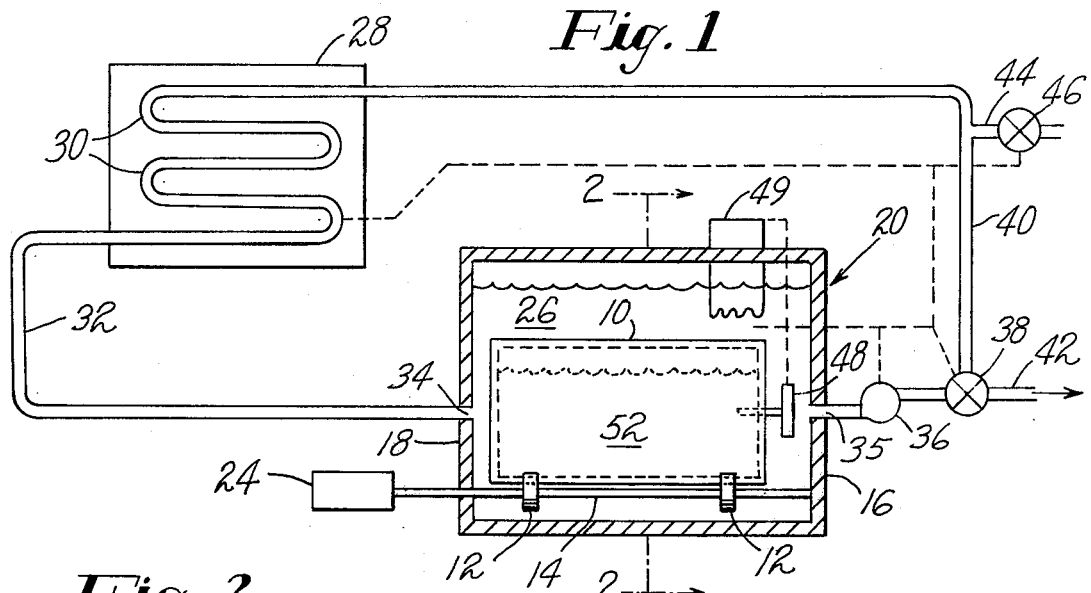
FIG. 1 is a partial cross-sectional view of a thermal storage apparatus of this invention.
Figure 2:
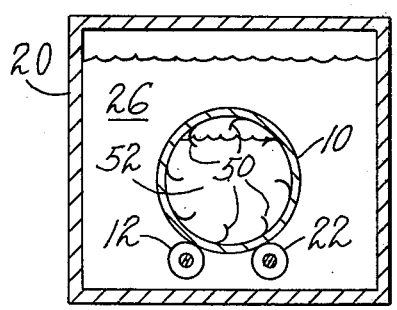
FIG. 2 is a cross-sectional view of the apparatus of FIG. 1 taken along line 2—2.

Referring to FIGS. 1 and 2, a container 10 houses a salt hydrate having a heat of fusion greater than about 50 BTU/lb, preferably greater than 75 BTU/lb. The container is supported on idle rollers 22 and movable rollers 12 supported on shaft 14 which is rotatably mounted on walls 16 and 18 of container 20. Idle rollers 22 are mounted also on a shaft (not shown) which is also rotatably mounted on walls 16 and 18. The rollers 12 and 22 are mounted at or near the ends of container 10 so that deflection of the walls of the container 10 is minimized. Shaft 10 and rollers 22 are activated by motor 24 attached to shaft 14.

Container 20 houses a heat exchange liquid 26 which surrounds container 10. The heat exchange liquid receives thermal energy in heat exchange unit 28 wherein the source of heat is not critical. For example, the heat source can be any means of combustion or direct or indirect solar energy radiation or electric energy. In relation to the heat exchange unit 28, there can be solar panels of any design which receive and trap radiant energy and which are in heat exchange relationships with the heat exchange liquid in the serpentine conduits 30. The heated liquid is passed from conduit 30 to conduit 32, through inlet 34, into container 20. The heated liquid in container 20 passes its heat through the container wall 10 to the salt hydrate in the container 10 thereby liquefying the salt hydrate so that it acquires both latent heat and sensible heat which later can be extracted upon demand.

Heat exchange liquid is circulated through the system by pump 36. Valve 38 is positioned to regulate liquid flow through conduit 40 to recycle liquid to the heat exchanger 28 and/or through conduit 42 to extract heat for use such as in a home heating system. Liquid from which heat has been extracted is returned to the system by conduit 44 when valve 46 is open.

For a given weight of salt hydrate, the volume of salt hydrate affords a measurement of the quantity of latent heat contained therein. The volume of salt hydrate increases with the increase of latent heat stored since a greater proportion of the salt hydrate is converted to liquid. For example, the volume of sodium thiosulfate pentahydrate increases about 9% when changing from total solid to total liquid. Accordingly, a pressure gauge 48 positioned to communicate with the container interior, preferably on its axis of motion, provides an analog measurement of the latent heat in the salt hydrate. Thermostats (not shown) are positioned in or adjacent conduits 30 and in the heat exchange liquid 26 to sense the temperature of the heat exchange liquid. The thermostats are linked in any conventional manner (as represented by the broken lines) to control pump 36 and valves 38 and 46 such as by pneumatic or electrical linkage. In addition, valves 38 and 46 and pump 36 can be linked electrically or pneumatically to conventional control means such as a thermostat in the area of use to control heat exchange liquid flow into the area of use.

The pressure gauge 48 provides a means by which the user can determine the latent heat content of the salt hydrate at any given time. Thus, the user can read gauge 48 and initiate the auxiliary heater 49 (e.g., electrical heater) to heat the heat exchange liquid 26. Alternatively, the user, upon noting that the salt hydrate contains less stored heat than desired, can manually override the automatic system to initiate pump 36 to circulate heat exchange liquid between the heat exchange unit 28 and the container 20. This quick and accurate determination of heat content in the salt hydrate is particularly useful in climates which experience seasonal changes when the heat exchange unit 28 is a solar heat exchange unit. In the winter, the auxiliary heater 49 and/or circulation between the solar heat exchange unit and the container 20 could be initiated to keep the salt hydrate at a relatively high pressure reading, while in summer such activation could be related to a different threshold pressure reading.

The container 10 is continuously rotated or oscillated by motor 24 and rollers 22 and is provided internally with mixing arms 50 extending from the wall of container 10 so that the salt hydrate 52 is maintained in an agitated condition. Continuous agitation of the container and of the salt hydrate 52 minimizes or prevents salt hydrate supercooling and minimizes or prevents stratification and dehydration of salt hydrate.

Figure 3:
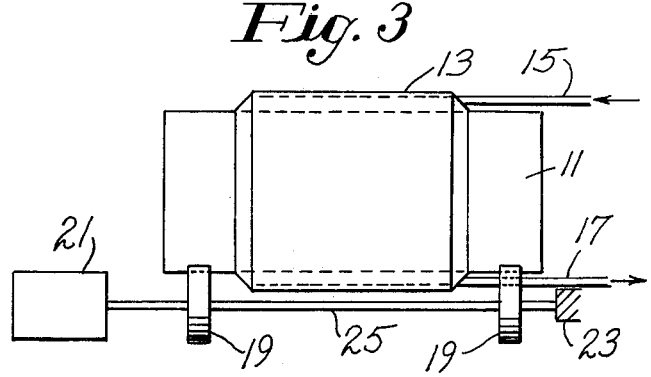
FIG. 3 is an alternative embodiment wherein heat exchange liquid is housed in a jacket surrounding a sealed container of salt hydrate.

Referring to FIG. 3, a container 11 is partially filled with the salt hydrate and is surrounded by a jacket 13. The jacket is sealed to the outer surface of container 11 and is filled with heat exchange liquid. The jacket 13 is provided with an inlet conduit 15 and an outlet conduit 17. The container is mounted on powered rollers 19 and idle rollers (not shown) such as in the manner shown in FIG. 2. The powered rollers are mounted on shaft 21, attached to motor 25 and rotatably attached to support 23. Since, in this mode, the container 13 for the heat exchange liquid is movable, the conduits 15 and 17 are flexibily connected to the jacket 13 to minimize mechanical stress in the conduits caused by agitating the container 11 and jacket 13. In addition, the container 11 is agitated in an oscillating mode so that mechanical stress on the conduits 15 and 17 is minimized and so that the conduits do not contact the rollers supporting the container 11.

Figure 4:
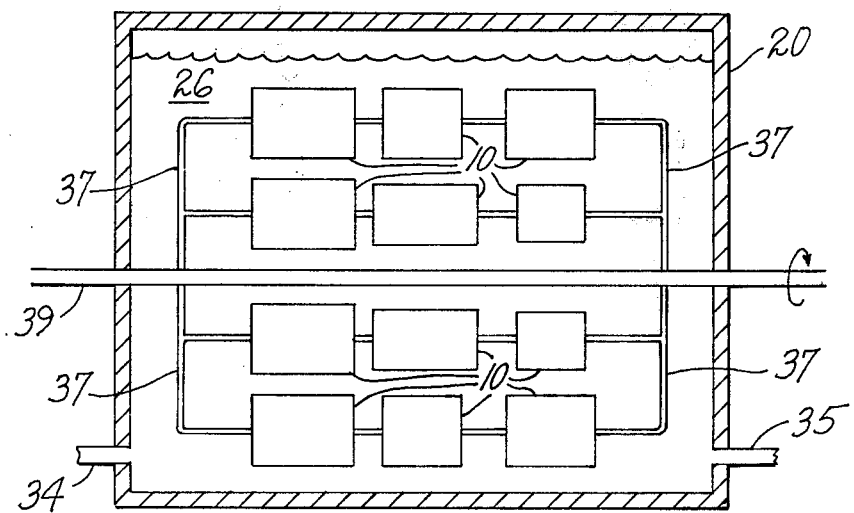
FIG. 4 is an alternative embodiment of this invention utilizing a plurality of sealed containers for the salt hydrate composition or compositions.

Referring to FIG. 4, a plurality of sealed containers 10 that contain a salt hydrate composition or compositions are immersed in a heat exchange liquid 26 which is enclosed in container 20 provided with an inlet 34 and an outlet 35. The containers are mounted on struts 37 which are, in turn, mounted on rotating shaft 39. This embodiment enlarged heat exchange surface area between the heat exchange liquid 26 and the salt hydrate sealed within containers 10. In this embodiment, different drums can contain different salt hydrates so that the latent heat of fusion could be extracted or stored over a wider temperature range than is available when each container contains the same salt hydrate composition.

An important aspect of this invention is the combined heat storage and release capacities of the heat exchange liquid in the container 30 or jacket 13 and the salt hydrate in container 10. The volume of heat exchange liquid in such container or jacket should be about between 1 to 20 and 2 to 1, preferably between about 1 to 10 and 2 to 1 volume ratio to the salt hydrate volume in its container. Thus, when employing water as the heat exchange liquid and sodium thiosulfate pentahydrate as the salt hydrate, the ratio of water volume to salt hydrate volume should be between about 1 to 10 and 2 to 1. At volume ratios higher than above stated, the temperature change in the water may be too small to be of practical use. At volume ratios lower than above stated, the lesser quantity of water does not provide the desired heat buffering capacity.

Representative useful salt hydrates in the present invention include sodium thiosulfate pentahydrates, calcium chloride hexahydrate, sodium carbonate decahydrate, disodium phosphate dodecahydrate, calcium nitrate tetrahydrate, sodium sulfate decahydrate or mixtures thereof or the like. Although not essential, the salt hydrate optionally can include a nucleating agent such as borax or the like in concentrations generally between about 0.5 wt % and 5 wt. % based upon the weight of the salt hydrate. In addition, the salt hydrate can include an anticorrosion agent to prevent corrosion of the salt hydrate container. Representative suitable anticorrosion agents include sodium dichromate or the like. The anticorrosion agent is not essential when employing a container made from a corrosion-resistant material such as stainless steel or heavy gauge cold rolled steel. In one aspect of this invention, water can be added to the salt hydrate for a variety of purposes, including but not limited to (1) promoting slurry-like crystallization in multiplicity of small crystals, (2) lowering the salt hydrate freezing point so as to relate the heat of fusion temperature during winter months to the temperature range of the heat source(s) and of the heat exchange liquid in winter. In summer months, the added water can be removed to raise the freezing point of the salt hydrate composition in relation to the temperature range of the heat exchange liquid and its principal heat source. Representative suitable heat exchange liquids include water, Dow-therm, water plus ethylene glycol of the like. In addition, the water also is useful to render the salt hydrate crystaline mass less hard and tenacious to the wall of the container.

In a representative embodiment of this invention, the apparatus of FIGS. 1 and 2 can be formed of a sealed stainless steel cylinder, 4 feet in diameter and 9 feet long which is 85% to 95% full with sodium thiosulfate pentahydrate having a phase change temperature of 120° F. The container housing the steel cylinder is formed of wood and is rectangular shaped having 10 ft. × 5 ft. × 5 ft. dimensions provided with a waterproof liner. The wooden container houses about 3 tons of water. The motor is rated at 1/15 HP to effect rotation of the steel cylinder at 4 revolutions per hour on a continuous basis. At this rate, the motor uses only about 2Kw/hr of energy per daytime period in winter. In operation, water is circulated through the wooden container from a source of heat to provide indirect exchange of heat to the sodium thiosulfate pentahydrate. The salt hydrate has a volume of about 104 cubic feet, a density of about 104 lb/cubic foot, a total mass of about 11,000 pounds and a latent heat of phase exchange of about 90 BTU/lb. The total amount of heat liberated when the salt changes from liquid to solid is about 990,000 BTU which is enough heat to maintain a moderate size, well-insulated house in the northeastern United States warm for 2 days in a typical sunless period in January.

Continual rotation or oscillation of the steel container prevents or sharply minimizes formation of stagnant layers at the inside surface and at the outside surface of the steel cylinder. This both improves heat exchange and greatly extends the number of effective salt hydrate heat cyclings. The water in the wooden container responds more quickly than the salt hydrate; this assists heat transfer to and from the salt hydrate. For example, the 3 tons of water mentioned could absorb a sudden pulse of 100,000 BTU, and go on transferring it to the salt hydrate which has a slower rate of response. Likewise, 100,000 BTU of heat could quickly be supplied from the water, with further heat extraction from the salt hydrate into the water to maintain its supply of heat to points of ultimate use.

It is to be understood that variations can be made from the specific embodiments described above. For example, the container for the salt hydrate can be filled only 55 to 60% so that it will float and the floating drum can be rotated with a perimeter friction-drive motor attached to the housing for the heat exchange liquid. Also, the container for the salt hydrate can include a self-cleaning device such as sliding metal disks to clean its inner wall of solid salt hydrate. In addition, the container for the salt hydrate and/or the container for the heat exchange liquid can be provided with an auxiliary electrical heating element to provide off-peak energy to the salt hydrate.

I claim:

1. Apparatus for storing thermal energy for subsequent use which comprises:
    means for exposing a heat exchange liquid to a heat source,
    means for passing the heated liquid into a first container which is in heat exchange relationship with a salt hydrate composition enclosed in at least one sealed container,
    said salt hydrate having a heat fusion of at least about 50 BTU/lb,
    the volume ratio of the heat exchange liquid in said first container to said salt hydrate being between about 1 to 20 and 2 to 1,
    means for agitating each sealed container continually to minimize or prevent supercooling of said salt hydrate,
    means for monitoring pressure within said sealed container,
    and means for periodically passing said heat exchange liquid from heat exchange relationship with said salt hydrate to extract heat from said liquid.

2. The apparatus of claim 1 which includes means for recycling said heat exchange liquid from said first container to said means for exposing the heat exchange liquid to a heat source.

3. The apparatus of claim 2 wherein the means for exposing the heat exchange liquid to a heat source is adapted to transfer solar heat to said liquid.

4. The apparatus of claim 3 wherein the second container houses sufficient heat exchange liquid to totally immerse said sealed container.

5. The apparatus of claim 2 wherein the second container houses sufficient heat exchange liquid to totally immerse said sealed container.

6. The apparatus of claim 1 wherein the means for exposing the heat exchange liquid to a heat source is adapted to transfer solar heat to said liquid.

7. The apparatus of claim 6 wherein the second container houses sufficient heat exchange liquid to totally immerse said sealed container.

8. The apparatus of claim 1 wherein the second container houses sufficient heat exchange liquid to totally immerse said sealed container.

9. The apparatus of claim 1 having a plurality of sealed containers for the salt hydrate and wherein said means for monitoring pressure is associated with at least one of said sealed containers.

10. The apparatus of claim 9 wherein at least one of said sealed containers contains a salt hydrate different from a salt hydrate in at least one of the remaining sealed containers.

11. The apparatus of claim 1 wherein said first container is attached to said sealed container and is adapted to be agitated with said sealed container.

12. The apparatus of claim 1 including means for monitoring the temperature of said heat exchange liquid in said first container and the temperature of said heat exchange liquid exposed to said heat source.

13. The apparatus of claim 1 including a second heating means adapted to heat said heat exchange liquid in said first container in response to the pressure monitored within said sealed container.

* * * * *